US012646026B2

(12) United States Patent　　　　　　　(10) Patent No.: US 12,646,026 B2
Misra et al.　　　　　　　　　　　　　　(45) Date of Patent: Jun. 2, 2026

(54) SYSTEM AND METHOD FOR AUTOMATED CROSS-APPLICATION AND INFRASTRUCTURE DEPENDENCY MAPPING

(71) Applicant: GalaxE.Solutions, Inc., Somerset, NJ (US)

(72) Inventors: Dheeraj Misra, Somerset, NJ (US); Sandipan Gangopadhyay, Somerset, NJ (US); Tim Bryan, Somerset, NJ (US)

(73) Assignee: GalaxE.Solutions, Inc., Somerset, NJ (US)

( * ) Notice: Subject to any disclaimer, the term of this patent is extended or adjusted under 35 U.S.C. 154(b) by 0 days.

(21) Appl. No.: 16/746,657

(22) Filed: Jan. 17, 2020

(65) Prior Publication Data

US 2020/0236000 A1　　Jul. 23, 2020

Related U.S. Application Data

(60) Provisional application No. 62/794,375, filed on Jan. 18, 2019.

(51) Int. Cl.
　　*G06Q 10/0635*　　　(2023.01)
　　*G06Q 10/10*　　　　(2023.01)
　　　　　(Continued)

(52) U.S. Cl.
　　CPC ......... *G06Q 10/0635* (2013.01); *G06Q 10/10* (2013.01); *H04L 41/12* (2013.01);
　　　　　(Continued)

(58) Field of Classification Search
　　CPC ......... H04L 41/12; H04L 41/22; H04L 63/20; H04L 1/1887; H04L 1/189;
　　　　　(Continued)

(56) References Cited

U.S. PATENT DOCUMENTS 5,960,200 A * 9/1999 Eager ..................... G06F 8/427
　　　　　　　　　　　　　　　　　703/13
6,523,172 B1 * 2/2003 Martinez-Guerra .... G06F 8/427
　　　　　　　　　　　　　　　　　704/9

(Continued)

OTHER PUBLICATIONS

PCT/US20/14193, International Search Report (PCT/ISA/210 and PCT/ISA/220) dated Apr. 28, 2020, enclosing Written Opinion of the International Searching Authority (PCT/ISA/237) (Nine (9) pages).

(Continued)

*Primary Examiner* — Greg C Bengzon
(74) *Attorney, Agent, or Firm* — Crowell & Moring LLP

(57) ABSTRACT

A system for infrastructure dependency mapping of an enterprise IT environment includes an application cross-dependency mapping engine configured to generate a multi-tier call hierarchy that, between and within each tier, maps the IT environment across a plurality of software applications of different types via which the IT environment is implemented. The system also includes a topology manager configured to, map the multi-tier call hierarchy to infrastructure elements of the IT enterprise environment, and thereby generate an infrastructure map.

5 Claims, 3 Drawing Sheets

(51) Int. Cl.
| | |
|---|---|
| *H04L 9/40* | (2022.01) |
| *H04L 41/12* | (2022.01) |
| *H04L 41/22* | (2022.01) |
| *G06F 11/3668* | (2025.01) |

(52) U.S. Cl.
CPC .............. H04L 41/22 (2013.01); H04L 63/20 (2013.01); *G06F 11/3684* (2013.01)

(58) Field of Classification Search
CPC . H04L 2001/0092; H04L 41/00; H04L 67/28; H04L 67/2876; H04L 67/34; H04L 69/16; H04L 69/166; H04L 67/16; H04L 41/085; H04L 67/10; H04L 67/306; G06Q 10/0635; G06Q 10/10; G06F 11/3684; G06F 8/30; G06F 11/368; G06F 11/3672; G06F 11/3696; G06F 11/3604; G06F 9/44589; G06F 11/323; G06F 11/3447; G06F 11/3466; G06F 11/3476; G06F 11/3608; G06F 11/3612; G06F 11/3632; G06F 12/0811; G06F 12/0813; G06F 12/084; G06F 16/2455; G06F 16/258; G06F 16/282; G06F 8/33; G06F 8/427; G06F 8/443; G06F 8/48; G06F 8/71; G06F 9/3004; G06F 9/30087; G06F 9/44563; G06F 9/467; G06F 11/3409; G06F 2201/815; G06F 2201/86; G06F 2201/865; G06F 8/36; G06F 8/38; G06F 8/41; G06F 8/433; G06F 8/75; G06F 11/301; G06F 11/32; G06F 11/3404; G06F 11/3438; G06F 11/3457; G06F 11/3495; G06F 11/3636; G06F 11/3688; G06F 11/3692; G06F 16/185; G06F 16/21; G06F 16/213; G06F 16/24; G06F 16/9024; G06F 2201/875; G06F 8/10; G06F 8/20; G06F 8/425; G06F 8/436; G06F 8/47; G06F 8/60; G06F 8/656; G06F 8/70; G06F 8/72; G06F 8/73; G06F 8/74; G06F 8/76; G06F 8/77; G06F 9/4451; G06F 9/44521; G06F 9/451; G06F 9/45516; G06F 9/4552; G06F 9/4806; G06F 9/5016; G06F 9/5072; G06F 9/5027; G06F 9/5038; G06F 9/505; G06F 9/5055; G06F 9/5066; G06F 9/5077; G06F 9/52; G06F 9/522; G06F 9/524; G06F 9/547; G06F 9/548
See application file for complete search history.

(56) References Cited

U.S. PATENT DOCUMENTS

| | | | | |
|---|---|---|---|---|
| 7,493,624 | B1 * | 2/2009 | Kautzleben | G06F 11/3409 |
| | | | | 718/100 |
| 7,664,729 | B2 * | 2/2010 | Klein | H04L 41/044 |
| | | | | 707/693 |
| 7,698,398 | B1 * | 4/2010 | Lai | G06Q 10/10 |
| | | | | 709/223 |
| 7,941,521 | B1 * | 5/2011 | Petrov | H04L 43/08 |
| | | | | 709/224 |
| 7,945,902 | B1 * | 5/2011 | Sahoo | G06F 9/44589 |
| | | | | 717/131 |
| 7,962,590 | B1 | 6/2011 | Or et al. | |
| 8,069,435 | B1 * | 11/2011 | Lai | G06Q 30/06 |
| | | | | 717/106 |
| 8,346,929 | B1 * | 1/2013 | Lai | H04L 63/20 |
| | | | | 709/226 |
| 8,543,907 | B1 * | 9/2013 | Roskind | G06F 8/443 |
| | | | | 715/234 |
| 8,762,951 | B1 * | 6/2014 | Kosche | G06F 8/443 |
| | | | | 717/127 |
| 9,323,644 | B1 * | 4/2016 | Hale | G06F 8/22 |
| 9,483,240 | B1 * | 11/2016 | Boyar | G06F 8/72 |
| 9,557,879 | B1 * | 1/2017 | Wang | H04L 41/145 |
| 9,792,203 | B2 * | 10/2017 | Tenev | G06F 11/3684 |
| 9,852,013 | B2 * | 12/2017 | Bequet | G06F 16/90344 |
| 10,324,713 | B2 * | 6/2019 | Allen | H04L 67/34 |
| 10,333,820 | B1 * | 6/2019 | Wang | H04L 41/12 |
| 10,467,390 | B1 * | 11/2019 | Wehrli | G06F 21/14 |
| 10,552,128 | B1 * | 2/2020 | Bailey | G06F 8/43 |
| 10,628,228 | B1 * | 4/2020 | Theunissen | H04L 63/10 |
| 10,642,896 | B2 * | 5/2020 | Bequet | G06F 16/90344 |
| 10,650,046 | B2 * | 5/2020 | Bequet | G06F 16/164 |
| 10,657,107 | B1 * | 5/2020 | Bequet | G06F 16/1727 |
| 10,732,608 | B2 * | 8/2020 | Janssen | G06F 8/436 |
| 11,063,815 | B2 * | 7/2021 | Shi | H04L 41/145 |
| 11,435,986 | B2 * | 9/2022 | Jaeger | G06F 9/5055 |
| 2003/0192036 | A1 * | 10/2003 | Karkare | G06F 11/3466 |
| | | | | 717/158 |
| 2004/0031015 | A1 * | 2/2004 | Ben-Romdhane | G06F 8/75 |
| | | | | 717/107 |
| 2005/0044197 | A1 * | 2/2005 | Lai | H04L 67/16 |
| | | | | 709/223 |
| 2005/0209876 | A1 * | 9/2005 | Kennis | G06Q 10/06311 |
| | | | | 726/1 |
| 2005/0289264 | A1 * | 12/2005 | Illowsky | G06F 9/542 |
| | | | | 710/104 |
| 2006/0225032 | A1 * | 10/2006 | Klerk | G06F 8/10 |
| | | | | 717/105 |
| 2006/0241961 | A1 * | 10/2006 | Tsyganskiy | G06Q 10/067 |
| | | | | 705/348 |
| 2006/0242173 | A1 * | 10/2006 | Tsyganskiy | G06F 8/72 |
| 2006/0242176 | A1 * | 10/2006 | Tsyganskiy | G06F 8/72 |
| 2006/0242197 | A1 * | 10/2006 | Tsyganskiy | G06F 8/72 |
| 2006/0293940 | A1 * | 12/2006 | Tsyganskiy | G06Q 10/06375 |
| | | | | 714/48 |
| 2006/0294499 | A1 * | 12/2006 | Shim | G06F 9/44 |
| | | | | 717/107 |
| 2007/0067756 | A1 * | 3/2007 | Garza | G06F 8/76 |
| | | | | 717/136 |
| 2007/0266366 | A1 * | 11/2007 | Bucuvalas | G06F 8/433 |
| | | | | 717/104 |
| 2008/0127120 | A1 * | 5/2008 | Kosche | G06F 11/3447 |
| | | | | 717/131 |
| 2008/0127149 | A1 * | 5/2008 | Kosche | G06F 8/443 |
| | | | | 717/158 |
| 2008/0177756 | A1 * | 7/2008 | Kosche | G06F 11/3476 |
| 2008/0276231 | A1 * | 11/2008 | Huang | G06F 8/71 |
| | | | | 717/145 |
| 2008/0300851 | A1 * | 12/2008 | Chakrabarti | G06F 8/433 |
| | | | | 703/22 |
| 2009/0013305 | A1 * | 1/2009 | Clarke | G06F 8/10 |
| | | | | 717/104 |
| 2009/0077090 | A1 * | 3/2009 | Pacifici | G06F 9/5038 |
| 2009/0328016 | A1 * | 12/2009 | Ng | G06F 8/427 |
| | | | | 717/143 |
| 2010/0070948 | A1 * | 3/2010 | Rama | G06F 8/72 |
| | | | | 717/105 |
| 2010/0312592 | A1 * | 12/2010 | Sallakonda | G06Q 10/10 |
| | | | | 705/7.37 |
| 2011/0055817 | A1 * | 3/2011 | Noble | G06F 11/32 |
| | | | | 717/127 |
| 2011/0137953 | A1 * | 6/2011 | Bobick | G06F 8/65 |
| | | | | 707/E17.011 |
| 2011/0138385 | A1 * | 6/2011 | Schmelter | G06F 11/32 |
| | | | | 718/1 |
| 2011/0185361 | A1 * | 7/2011 | Ng | G06F 9/4843 |
| | | | | 718/102 |
| 2011/0296391 | A1 * | 12/2011 | Gass | G06F 8/72 |
| | | | | 717/168 |
| 2012/0151455 | A1 * | 6/2012 | Tsantilis | G06F 11/3688 |
| | | | | 717/132 |
| 2012/0192151 | A1 * | 7/2012 | Parkes | G06F 8/34 |
| | | | | 717/120 |
| 2013/0159978 | A1 * | 6/2013 | Jazdzewski | G06F 11/3636 |
| | | | | 717/129 |

(56)                References Cited

U.S. PATENT DOCUMENTS

| | | | | |
|---|---|---|---|---|
| 2013/0326481 | A1* | 12/2013 | Kannan | G06F 8/71 717/123 |
| 2014/0019598 | A1* | 1/2014 | Krajec | G06F 9/5083 709/220 |
| 2014/0019756 | A1* | 1/2014 | Krajec | G06F 21/52 713/167 |
| 2014/0019985 | A1* | 1/2014 | Krajec | G06F 9/4806 718/102 |
| 2014/0025572 | A1* | 1/2014 | Krajec | G06F 9/5055 705/40 |
| 2014/0109078 | A1* | 4/2014 | Lang | G06F 21/57 717/172 |
| 2014/0366006 | A1* | 12/2014 | Gottschlich | G06F 11/323 717/125 |
| 2015/0066869 | A1* | 3/2015 | Seto | G06F 21/31 707/688 |
| 2015/0067652 | A1* | 3/2015 | Seto | G06F 11/34 717/125 |
| 2015/0100879 | A1* | 4/2015 | Nandagopal | G06F 9/44521 715/235 |
| 2015/0381711 | A1* | 12/2015 | Singh | H04L 41/0813 709/221 |
| 2016/0062736 | A1* | 3/2016 | Stanfill | G06F 8/34 717/105 |
| 2016/0062747 | A1* | 3/2016 | Stanfill | G06F 8/433 717/144 |
| 2016/0072913 | A1* | 3/2016 | Baldwin | H04L 67/16 709/201 |
| 2016/0092179 | A1* | 3/2016 | Straub | G06F 8/71 717/107 |
| 2016/0092336 | A1* | 3/2016 | Atanasiu | G06F 11/3698 717/133 |
| 2016/0092348 | A1* | 3/2016 | Straub | G06F 8/61 717/124 |
| 2016/0103886 | A1* | 4/2016 | Prophete | G06F 16/248 707/722 |
| 2016/0179569 | A1* | 6/2016 | Gottschlich | G06F 12/084 711/147 |
| 2016/0246705 | A1* | 8/2016 | Bitar | G06F 11/3684 |
| 2016/0261466 | A1* | 9/2016 | Daniel | G06F 16/2455 |
| 2016/0291972 | A1 | 10/2016 | Bryan | |
| 2016/0321126 | A1* | 11/2016 | Burugula | G06F 11/0778 |
| 2017/0060542 | A1* | 3/2017 | Mandal | G06F 16/835 |
| 2017/0109933 | A1* | 4/2017 | Voorhees | G06F 11/36 |
| 2017/0139690 | A1* | 5/2017 | Pesarese | G06F 8/41 |
| 2017/0177312 | A1* | 6/2017 | Boehm | G06N 20/00 |
| 2017/0177410 | A1* | 6/2017 | Laroche | G06F 9/5016 |
| 2017/0195183 | A1* | 7/2017 | Gershaft | H04L 41/22 |
| 2017/0269970 | A1* | 9/2017 | Bequet | G06F 16/9014 |
| 2017/0351512 | A1* | 12/2017 | Iwanir | G06F 8/72 |
| 2018/0032055 | A1* | 2/2018 | Janssen | G06F 8/436 |
| 2018/0081716 | A1* | 3/2018 | Yu | H04L 41/12 |
| 2018/0088937 | A1* | 3/2018 | Tamir | G06F 8/72 |
| 2018/0121255 | A1* | 5/2018 | Heidinga | G06F 9/526 |
| 2018/0131558 | A1 | 5/2018 | Sharma | |
| 2018/0136983 | A1* | 5/2018 | Bequet | G06F 16/90344 |
| 2018/0181446 | A1* | 6/2018 | Bequet | G06F 16/9024 |
| 2018/0189113 | A1* | 7/2018 | Bequet | G06F 16/90344 |
| 2018/0309645 | A1* | 10/2018 | Curtis | G06F 3/167 |
| 2019/0012155 | A1* | 1/2019 | Oey | G06F 8/60 |
| 2019/0012403 | A1* | 1/2019 | Bequet | G06F 16/90344 |
| 2019/0114165 | A1* | 4/2019 | Ghiondea | G06F 8/65 |
| 2019/0114302 | A1* | 4/2019 | Bequet | H04L 67/10 |
| 2019/0138555 | A1* | 5/2019 | Bequet | G06F 16/9014 |
| 2019/0146997 | A1* | 5/2019 | Jin | G06F 16/9014 718/104 |
| 2019/0146998 | A1* | 5/2019 | Jin | G06F 16/25 718/104 |
| 2019/0163452 | A1* | 5/2019 | Hoffmann | G06F 8/443 |
| 2019/0213004 | A1* | 7/2019 | Zhu | G06F 8/71 |
| 2019/0306692 | A1* | 10/2019 | Garty | H04W 8/005 |
| 2019/0327154 | A1* | 10/2019 | Sahoo | H04L 43/045 |
| 2019/0370288 | A1* | 12/2019 | Bequet | G06F 16/9014 |
| 2019/0391791 | A1* | 12/2019 | Bebee | G06F 8/4441 |
| 2020/0026732 | A1* | 1/2020 | Bequet | G06F 9/46 |
| 2020/0104179 | A1* | 4/2020 | Baldwin | G06F 9/5005 |
| 2020/0249941 | A1* | 8/2020 | Tornhill | G06F 8/77 |

OTHER PUBLICATIONS

International Preliminary Report on Patentability (PCT/IB/326 and PCT/IB/373) and Written Opinion (PCT/ISA/237) dated Jul. 29, 2021 (Eight (8) pages).
English-language Indian Office Action issued in Indian application No. 202117034749 dated Jan. 17, 2023 (Six (6) pages).

* cited by examiner

Figure 1:
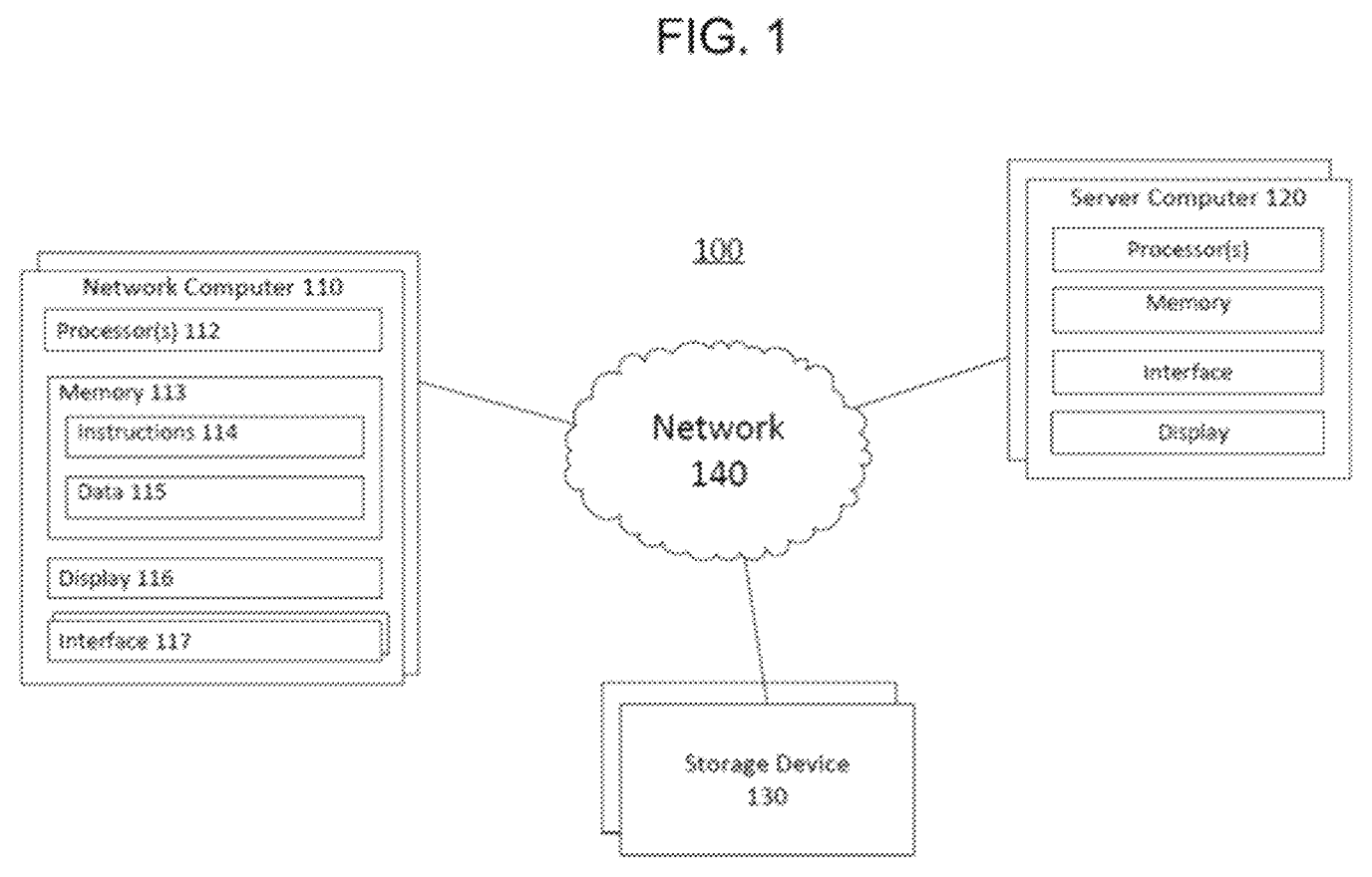

Server Computer 120
- Processor(s)
- Memory
- Interface
- Display

Network 140

Storage Device 130

Network Computer 110
- Processor(s) 112
- Memory 113
  - Instructions 114
  - Data 115
- Display 116
- Interface 117

300

301  automated parsing of source code and database 302  determine links between and among parsed information 303  build multi-tier hierarchy based on links 304  map multi-tier hierarchy against infrastructure elements 305  identify weaknesses in infrastructure topology generate navigable end-to-end graphical representation of execution dependencies

SYSTEM AND METHOD FOR AUTOMATED CROSS-APPLICATION AND INFRASTRUCTURE DEPENDENCY MAPPING

CROSS REFERENCE TO RELATED APPLICATIONS

This application claims the benefit of U.S. Provisional Application No. 62/794,375, filed on Jan. 18, 2019, which is related to U.S. application Ser. No. 15/087,768, entitled "System and method for Automated Cross-Application Dependency Mapping," filed on Mar. 31 2016, the contents of which are incorporated herein by reference in its entirety.

BACKGROUND ART

A typical enterprise IT environment is a combination of older legacy business applications and newer, more modern applications. With evolving business needs, the architectural complexity behind the integration scheme of legacy and modern business applications within the enterprise IT environment increases over time. Between legacy and modern applications, the legacy applications are typically considered more difficult to maintain, modify, or enhance because there is a general lack of understanding about the legacy application and its dependencies with other applications. For example, those individuals who were considered experts on the subject matter of the legacy application may no longer be available as a resource, whether by retirement or loss of knowledge and expertise over extended periods of time. The situation is worsened with a lack of accessible documentation concerning the operation and integration of the legacy application. For these reasons, a legacy business application can present challenges for those individuals who later join the business organization.

When a business application attains legacy status, there is typically hesitation to introduce a change to the legacy code. This hesitation is typically the result of a lack of available subject matter expertise that presents difficulties and challenges in, for example: (1) analyzing the impact on the enterprise IT environment due to a programming change; (2) assessing potential risks posed by a programming change; (3) sizing the change and regression impact; (4) identifying those project stakeholders who may be impacted by a change; (5) planning the regression test; (6) designing the change optimally; and (7) delivering the change quickly and effectively to the business. Conversely, there is a constant need to change the legacy code because of ever-evolving business needs that must be addressed.

If not addressed, these challenges can lead to ineffective IT solutions that force a design that works around making changes to a legacy application. Eventually, this can lead the enterprise to an institutional mindset of delaying any modernization initiatives.

In order to overcome the above challenges and to efficiently and effectively analyze the impact on an enterprise IT system due to a programming change to a legacy business application, the enterprise should be able to easily and quickly identify cross dependencies among applications (both new and legacy) and across the applications' corresponding technology and architectural tiers. The enterprise should also be able to easily and quickly identify corresponding infrastructure dependencies.

While it is known that the cross-dependency maps are crucial for this type of analysis, it is a complex, time-consuming, and expensive task for the enterprise to generate a useful cross-dependency map from application source code automatically and on-demand. Typically, cross-tier analysis is performed manually, which is time-consuming and prone to error.

Prior methods of generating cross-dependency maps are infrastructure centric and not application centric. There are agent-based or agentless techniques available that probe or detect activities in the server infrastructure, but these techniques do not help perform an analysis of the larger impact resulting from a change to a software application. In addition, the prior methods can only identify hierarchy within a technology tier, which forces a cross-tier analysis to be performed manually. These prior methods are targeted for modern applications, but not for the practical enterprise with an IT environment that includes disparate legacy and modern business applications.

In that regard, a system and method for automatically generating cross-application and infrastructure dependency maps for enterprise IT environments, for example, is needed. Other objects, advantages and novel features of the present invention will become apparent from the following detailed description of one or more preferred embodiments when considered in conjunction with the accompanying drawings. It should be recognized that the one or more examples in the disclosure are non-limiting examples and that the present invention is intended to encompass variations and equivalents of these examples. The disclosure is written for those skilled in the art. Although the disclosure use terminology and acronyms that may not be familiar to the layperson, those skilled in the art will be familiar with the terminology and acronyms used herein.

BRIEF DESCRIPTION OF THE DRAWINGS

FIG. 1 illustrates an example system in accordance with one or more aspects of the disclosure.

DETAILED DESCRIPTION OF EMBODIMENTS OF THE INVENTION

Figure 2:
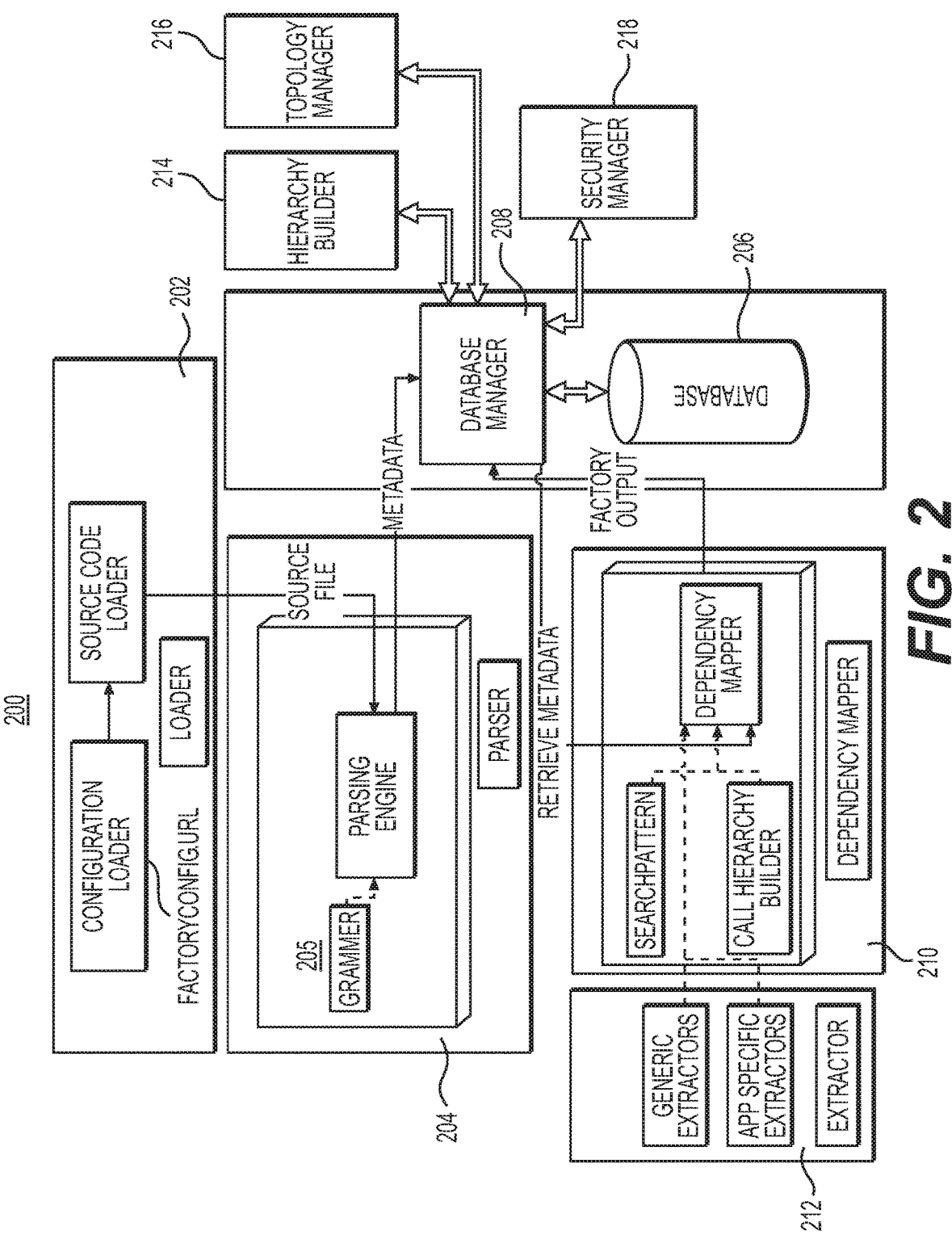
FIG. 2 illustrates a diagram of the architecture for an automated cross-application and infrastructure dependency mapping system in accordance with one or more aspects of the disclosure.

The disclosure is directed to enterprise information technology (IT) environments, and more particularly to more efficient management of such enterprise IT environments through automated cross-application and infrastructure dependency mapping.

A system and method for automatically generating cross-application and infrastructure dependency maps for enterprise IT environments is described herein. Automated code parsing techniques, for example, are used to identify dependencies between and among different business applications within the IT environment, including for both legacy and modern business applications. These dependencies are then utilized to map the applications to their corresponding infrastructure elements within the enterprise network topology. A thorough analysis of the enterprise-wide impact of a programming change, such as, for example, a change to the code of a legacy business application, or an infrastructure change, can be conducted. In one aspect, there is the ability to perform canonical and customized searches of dependent elements between components of the IT environment and generate impact reports that can show how desired changes to particular applications and/or infrastructure may affect the environment.

The impact of changes in a code repository, which may include documents in different programming languages that reside in a separate code environment, may be identified and analyzed. Integration with quality assurance tools and software, such as McCabe, is possible to generate test cases and provide objective data on code coverage. To that end, manual identification of cross-application dependencies and interpretation of data, for instance, may be eliminated.

The present disclosure provides a number of benefits and/or advantages over prior methods of generating cross-dependency maps. For example, complex and complete bottom-up parsing and analysis of the code base, including all legacy and modern business applications that are part of the larger enterprise IT environment, is available which may help eliminate the draw-backs of a top-down approach to mapping, such as the failure to identify many critical elements and dependencies of the applications in an IT environment. There is end-to-end traceability and the ability to perform scenario-based simulations of changes to the code base and/or infrastructure elements to identify how changes to the code of legacy and/or modern business applications and/or infrastructure elements will impact the overall enterprise IT environment. In that regard, automated generation of cross-application dependency maps may be used to search for and identify impacted high-level use cases, transaction and screen flows, code, data elements, files, and other technical assets across the enterprise IT environment.

An additional benefit and/or advantage, for example, may be that automated dependency mapping will assist in prioritizing deliverables and minimize or even eliminate unintentional impact to the enterprise IT environment. Targeted complexity and risk analysis allows for efficiency and timeliness of key decision-making that impacts the overall enterprise on a daily basis. Impact assessment may drive and enhance the comprehensiveness of enterprise environment requirements and design, and provide guidance for targeted regression analysis and test and code coverage metrics, including an assessment of the risk associated with any proposed change to one or more components of the enterprise IT environment. Test cases may be automatically generated and require only subject matter expert (SME) validation.

A further additional benefit and/or advantage, for example, is that integration may be possible with a variety of tools, including MULE ESB (with an available ID Auto Code Generation enhancement), and automatic identification is capable for dead code, obsolete functions, sequence flow, and data points that may be used to establish caller and callee identity. The described automated cross-application dependency mapping may provide efficiency gains of up to eighty percent over traditional manual-based methods.

While the invention may be used in connection with C, C++, VB6, .Net suite, Java/J2EE, Cobol, DCLGEN, JCL, PL/SQL, and Oracle Forms, it should be appreciated that the invention may be equally applicable to other known or future programming languages as well.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment.

Furthermore, the particular features, structures, or characteristics may be combined in any suitable manner on one or more embodiments without limitation. The term "or" as used herein is to be interpreted as inclusive or meaning any one or any combination.

In accordance with the practices of persons skilled in the art, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention. However, it should be appreciated that the invention may be practiced without such specific details. Additionally, for brevity sake well-known methods, procedures, components, and circuits have not been described in detail.

FIG. 1 illustrates an example system 100 in accordance with one or more aspects of the disclosure. For instance, system 100 may represent at least a portion of an IT environment. System 100 may include a plurality of computers and/or computing devices, such as, network computer 110, server computer 120, and storage device 130. By way of example only, network computer 110 is connected to network 140 and may include different types of components associated with a computer, such as one or more processors 112, memory 113, instructions 114, data 115, display 116, and an interface 117. The network computer 110 may be mobile (e.g., laptop computer, tablet computer, smartphone, PDA, etc.) or stationary (e.g., desktop computer, etc.). Similarly, server computer 120 may also include one or more processors, memory, interface, and/or display and may be configured to communicate with other computer devices on network 140.

The processor 112 of network computer 110 may instruct the components thereof to perform various tasks based on the processing of information and/or data that may have been previously stored or have been received, such as instructions 114 and/or data 115 stored in memory 113. The processor 112 may be a standard processor, such as a central processing unit (CPU), or may be a dedicated processor, such as an application-specific integrated circuit (ASIC) or a field programmable gate array (FPGA).

Memory 113 stores at least instructions 114 and/or data 115 that can be accessed by processor 112. For example, memory 113 may be hardware capable of storing information accessible by the processor, such as a ROM, RAM, hard-drive, CD-ROM, DVD, write-capable, read-only, etc. The set of instructions may be included in software that can be implemented on the network computer 110 and should be noted that the terms "instructions," "steps," "algorithm," and "programs" may be used interchangeably. Data 115 can be retrieved, manipulated or stored by the processor 112 in accordance with the set of instructions 114 or other sets of executable instructions. The data 115 may be stored as a collection of data.

The display 116 may be any type of device capable of communicating data to a user, such as a liquid-crystal display ("LCD") screen, a plasma screen, etc. Interface 117 allow a user to communicate with the network computer 110 and may be a physical device (e.g., a port, a keyboard, a mouse, a touch-sensitive screen, microphone, camera, a universal serial bus (USB), CD/DVD drive, zip drive, card reader, etc.) and/or may be virtual (e.g., a graphical user interface "GUI," etc.).

The server computer 120 (and additional server computers) may be rack mounted on a network equipment rack and/or located, for instance, in a data center. In one example, the server computer 120 may use the network 140 to serve the requests of programs executed on network computer 110 and/or storage device 130.

The storage device 130 illustrated in FIG. 1 may be configured to store large quantities of data and/or information. For example, the storage device 130 may be a collection of storage components, or a mixed collection of storage components, such as ROM, RAM, hard-drives, solid-state drives, removable drives, network storage, virtual memory, cache, registers, etc. The storage device 130 may also be configured so that the network computer 110 and/or server computer 120 may access it via the network 140.

The network 140 may be any type of network, wired or wireless, configured to facilitate the communication and transmission of data, instructions, etc. from one component to another component of the network. For example, the network 140 may be a local area network (LAN) (e.g., Ethernet or other IEEE 802.03 LAN technologies), Wi-Fi (e.g., IEEE 802.11 standards, wide area network (WAN), virtual private network (VPN), global area network (GAN)), any combination thereof, or any other type of network.

It is to be understood that the network configuration illustrated in FIG. 1 serves only as an example and is thus not limited thereto. System 100, for instance, may include numerous other components connected to network 140, include more than one of each network component (as shown by the cascaded blocks), and network 140 may be connected to other networks.

FIG. 2 illustrates one embodiment of an architecture 200 for automated cross-application dependency mapping. The architecture 200 shown in FIG. 2 includes a loader 202, a parser 204, a database 206, including a database manager 208, a dependency mapper 210, an extractor 212, a hierarchy builder 214, a topology manager 216, and a security manager 218.

One example of the operation of the system architecture shown in FIG. 2 is as follows. A user specifies a desired configuration file (or files) through an input/output device, such as a graphical user interface (not shown) via, for example, network computer 110 of network 140 as shown in FIG. 1, and the specified configuration file (or files) is loaded by the configuration loader of loader 202.

The project base path may be analyzed in order to identify source files to be parsed that are relevant to the loaded configuration. The source code loader of loader 202 loads the file paths of the relevant source files into the parsing queue (e.g., "parsing engine" illustrated in FIG. 2) of the parser 204. Parsing "Grammer" 205 (or otherwise known as parsing grammar) shown in FIG. 2 may be provided to the parsing queue. The parsing grammer 205 may include various rules associated with the symbols, grammatical structure of linear text input, etc. from the relevant source files in order to carry out parsing by the parser 204. The parsing technique implemented by the parser 204 may be, for instance, bottom-up parsing.

Once the file paths of the relevant source files are loaded into the parsing queue, the configured threads are started by the parser 204. Each configured thread will pick a source file corresponding to a file path stored in the parsing queue and parse the source file and extract the information from the source file relevant to the loaded configuration and add the extracted information into the database manager 208, which may include a queue (not shown). For example, the extracted information may be known as "metadata," as shown in FIG. 2. A dedicated queue will poll the parsed information added to the queue and will update the database 206 accordingly. The database manager 208 and/or database 206 may be stored, for example, in storage device 130 of network 140, as illustrated in FIG. 1. Both the parsing of the relevant source files and processing of the extracted information that is put into the queue may occur in parallel.

After the parser completes parsing of all of the relevant source files, a dependency manager within the dependency mapper 210 will begin to analyze the call hierarchy of each of the service operations or tasks related to information extracted from the relevant source files, which complete call hierarchy report for the particular service operation or task will then be written to the database 206 via the database manager 208 Utilizing the complete call hierarchy report, the hierarchy builder 214 then builds a multi-tier hierarchy that, for each tier, maps the IT environment according to that tier, across the different technologies in which the IT environment may be implemented.

A "business process" tier maps the IT environment according to the different business processes of the IT environment. In building the business process tier, the information extracted from the source code and/or database is tied to the business processes implemented by the IT environment. A "use case" tier maps the IT environment according to its different use cases. In building the use case tier, the information extracted from the source code and/or database is tied to the use cases implemented by the IT environment. A "system modules" tier maps the IT environment according to its different system modules. In building the system modules tier, the information extracted from the source code and/or database is tied to the system modules of the IT environment. A "source code" tier maps the IT environment according to its source code. In building the source code tier, the information extracted from the source code and/or database is used to map the source code to operations or tasks of the IT environment, including a call hierarchy. A "data elements" tier maps the IT environment according to its data elements. In building the source code tier, the information extracted from the source code and/or database is used to map the data elements to operations or tasks of the IT environment. The multi-tier hierarchy is then written to the database 206 via the database manager.

A topology manager 216 in turn maps each of these tiers directly to the infrastructure elements implicated by each business process, use case, system module, source code segment, and data element. A complete infrastructure map, inclusive of the infrastructure topology with respect to each tier, is then written to the database 206 via the database manager.

A final report is generated that includes complete details of the particular service operation or task and corresponding transactions, including of the complete infrastructure map for each of the operations or tasks. The final report may be accessed by the user through the input/output device, such as a graphical user interface of the network computer 110 and/or the server computer 120 of network 140, as illustrated in FIG. 1. By way of example, the final report may be used, or may be further depended on by other network computers, to maintain, modify, and/or enhance the various applications (and the above-described source files) and/or infrastructure elements that are associated with the enterprise IT environment. For instance, the final report may be used to generate service reports for particular end users, customers, and/or consumers, which may be a series of reports on the various hierarchies associated with their respective enterprise IT environments. These service reports may provide detailed analysis of the hierarchies and the overall impact and/or implications on their IT system(s). In one example, a service report may be in digital format and may be utilized on one or more GUIs by the end user, customers, and/or consumers.

The complete infrastructure map may also be utilized by a security manager 218 to identify weaknesses within the network infrastructure topology, such as, for example, points of failure and choke points. For example, the security manager 218 may analyze the complete infrastructure map to identify anomalies and discontinuities in the trace of information from entry to exit points. Moreover, the amount of time spent at each point in the infrastructure may be traced out to determine any infrastructure hotspots. Deeper code level analysis or data level analysis—made possible by the complete infrastructure map—may also be performed in order to determine the root cause of a failure or potential choke point. Such identifications may be included in the final report and/or service reports.

Figure 3:
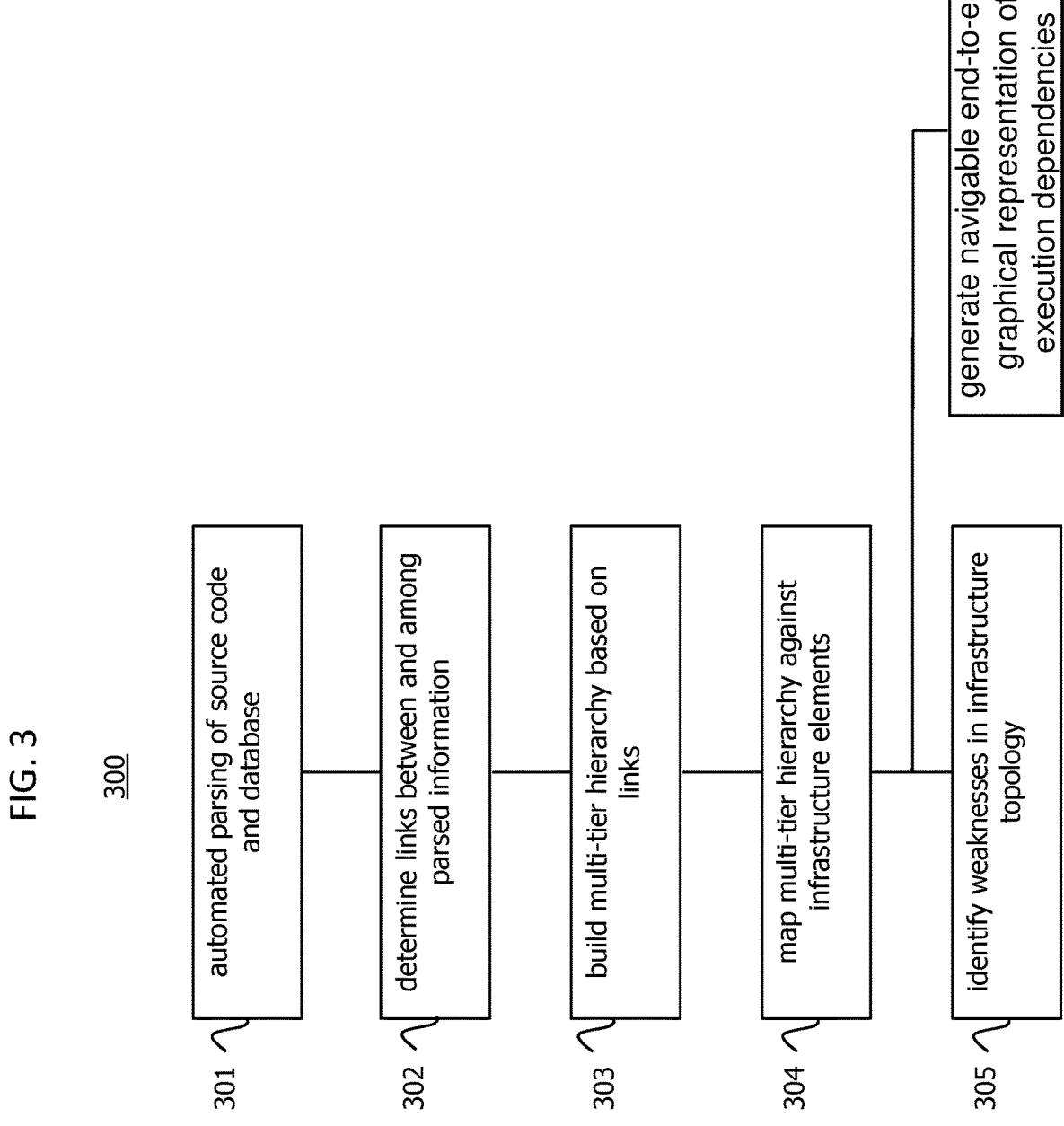
FIG. 3 illustrates a flow diagram of an algorithm used by the architecture of FIG. 2 in accordance with one or more aspects of the disclosure.

As described above, FIG. 3 illustrates a flow-diagram 300 of an algorithm used by the architecture of FIG. 2 in accordance with one or more aspects of the disclosure. As shown, at step 301, the source code and database reflecting the current state of the IT environment is provided to the parser 204 which uses automated parsing techniques to identify dependencies between and among different business applications, use cases, transactions, data elements and code assets, within the IT environment. At step 302, the parsed information is analyzed and links are determined between and among the parsed information, which are saved in the database 204. At step 303, the hierarchy builder 214 builds a multi-tier hierarchy that, for each tier, maps the IT environment according to that tier, across the different technologies in which the IT environment may be implemented. At step 304, the different tiers of the multi-tier hierarchy are mapped against the infrastructure elements to generate the complete infrastructure map. At step 305, the complete infrastructure map is utilized to identify weaknesses within the network infrastructure topology, such as, for example, points of failure and choke points. In this manner, the advantages of the invention are achieved.

In accordance with foregoing embodiments, examples, and/or aspects of the invention, end-to-end traceability of functions, transactions, services across application and infrastructure boundaries is provided. A trace may be viewed by starting at any level of the multi-tier hierarchy, and a caller can be traced to the source application that invokes the relevant function, transaction, or service and/or infrastructure. The embodiments of the invention provide the ability to search all callers of a particular function, transaction, or service across application tiers, and callers may be searched by starting at the application boundary level. In addition, potential orphans and duplicates can be identified at any point, with the hierarchy function usable to identify duplicates.

In a further aspect of the disclosure, an easy-to-use, intuitive GUI is provided that includes a dashboard that permits a user to view end-to-end traceability of relevant functions, transactions, and/or services, including end-to-end infrastructure traceability. Links may be provided within the GUI that can be clicked by a user in order to navigate directly to the relevant code or infrastructure element from a given use case, test case, or business rule, and vice versa.

While certain exemplary embodiments have been described and shown in the accompanying drawings, it is to be understood that such embodiments are merely illustrative of and not restrictive on the broad inventions, and that this inventions not be limited to the specific constructions and arrangements shown and described, since various other modifications may occur to those ordinarily skilled in the art.

The invention claimed is:

1. A method for infrastructure dependency mapping of an enterprise IT environment, the method comprising:

receiving source code files associated with the enterprise IT environment, wherein the source code files include source code corresponding to a plurality of software applications having different programming language and separate code environments via which the enterprise IT environment is implemented;

parsing the source code to thereby obtain parsed information characterizing source code execution dependencies for function, transaction and service calls of each of the service operations of each of the plurality of different software applications across application boundaries within the lines of the respective source code;

analyzing the execution dependencies of each of the service operations between the plurality of different software applications, based on the parsed information, wherein the service operations are across application boundaries, so as to generate a multi-tier call hierarchy that comprises a relational database that maps the execution dependencies between and among rules, functions and variables of the software applications across application boundaries;

mapping the software applications to infrastructure elements of the enterprise IT environment in accordance with the execution dependencies mapped by the multi-tier hierarchy, so as to generate an infrastructure map of the enterprise IT environment; and generating a graphical user interface, including an end-to-end graphical representation of the execution dependencies of the respective software functions, transactions, and services and infrastructure elements between and among the software applications and infrastructure elements, wherein the end-to-end graphical representation includes links via which the end-to-end graphical representation is visually navigable by a user across application and infrastructure boundaries.

2. The method of claim 1, wherein the tiers of the multi-tier call hierarchy include: business process, use case, system module, source code segment, and data element.

3. The method of claim 2, wherein the multi-tier call hierarchy is mapped to the infrastructure elements implicated by each business process, use case, system module, source code segment, and data element of the multi-tier hierarchy.

4. The method of claim 1, further comprising:

generating, via a graphical user interface, a report visualizing the infrastructure map.

5. The method of claim 1, further comprising:

identifying infrastructure weaknesses within the enterprise IT environment infrastructure based on the infrastructure map.

\* \* \* \* \*